United States Patent [19]

Smith

[11] Patent Number: 4,884,584

[45] Date of Patent: Dec. 5, 1989

[54] INTERNALLY PRELOADED METAL-TO-METAL SEAL HYDRAULIC CONNECTOR

[75] Inventor: Robert E. Smith, Stafford, Tex.

[73] Assignee: National Coupling Company, Inc., Stafford, Tex.

[21] Appl. No.: 85,982

[22] Filed: Aug. 14, 1987

[51] Int. Cl.⁴ .................................. F16L 37/28
[52] U.S. Cl. .................. 137/614.04; 137/236.1; 285/101; 285/108; 285/111
[58] Field of Search .............. 137/614.02, 614.04, 137/236.1; 285/101, 108, 111

[56] References Cited

U.S. PATENT DOCUMENTS

| | | | |
|---|---|---|---|
| 1,913,982 | 6/1933 | Fox | 285/111 |
| 1,928,821 | 10/1933 | Santiago | 285/22 |
| 2,218,318 | 10/1940 | Pfauser | 284/19 |
| 2,265,267 | 12/1941 | Cowles | 285/111 |
| 2,735,696 | 2/1956 | Omon et al. | 137/614.05 |
| 2,825,590 | 4/1958 | Sutherland | 286/26 |
| 3,046,026 | 7/1962 | Burrows | 277/171 |
| 3,089,713 | 5/1963 | Scaramucci | 285/14 |
| 3,111,179 | 11/1963 | Albers et al. | 175/393 |
| 3,215,161 | 11/1965 | Goodwin et al. | 137/614.04 |
| 3,236,251 | 2/1966 | Hansen | 137/614.05 |
| 3,291,152 | 12/1966 | Comer | 137/614.04 |
| 3,348,575 | 10/1967 | Simak | 137/614.05 |
| 3,507,523 | 4/1970 | Cadley | 285/307 |
| 3,516,524 | 6/1970 | Kelty et al. | 192/3.3 |
| 3,550,624 | 12/1970 | Johnson | 137/614 |
| 3,618,690 | 11/1971 | Johnson | 137/514.7 |
| 3,707,878 | 1/1973 | Treichler | 92/164 |
| 3,727,952 | 4/1973 | Richardson | 285/101 |
| 3,797,510 | 3/1974 | Torres et al. | 137/68 |
| 3,899,199 | 8/1975 | Garey | 285/101 |
| 3,917,220 | 11/1975 | Gilmore | 251/86 |
| 4,124,228 | 11/1978 | Morrison | 285/1 |
| 4,222,411 | 9/1980 | Herzan et al. | 137/614.04 |
| 4,348,039 | 9/1982 | Miller | 285/1 |
| 4,452,462 | 6/1984 | Karr, Jr. | 277/105 |
| 4,582,295 | 4/1986 | Kugler et al. | 251/149.6 |
| 4,589,689 | 5/1986 | Regan | 285/108 |
| 4,637,470 | 1/1987 | Weathers et al. | 166/344 |
| 4,641,841 | 2/1987 | Regan | 277/30 |
| 4,656,393 | 4/1987 | Amboss | 315/5.38 |
| 4,694,859 | 9/1987 | Smith | 285/108 |
| 4,709,726 | 12/1987 | Fitzgibbons | 137/614.04 |
| 4,709,727 | 12/1987 | Gober | 137/625.66 |

FOREIGN PATENT DOCUMENTS

| | | |
|---|---|---|
| 0024986 | 3/1981 | European Pat. Off. . |
| 0177650 | 4/1986 | European Pat. Off. . |
| 663132 | 10/1928 | France . |
| 1142462 | 12/1955 | France . |
| 76801 | 11/1958 | France . |
| 1491524 | 6/1966 | France . |
| 343726 | 7/1956 | Switzerland . |
| 552435 | 4/1943 | United Kingdom . |
| 552682 | 4/1943 | United Kingdom . |
| 677685 | 8/1952 | United Kingdom . |
| 819421 | 9/1959 | United Kingdom . |
| 886133 | 1/1962 | United Kingdom . |
| 888143 | 1/1962 | United Kingdom . |
| 925491 | 5/1963 | United Kingdom . |
| 1548852 | 7/1979 | United Kingdom . |
| 1564906 | 4/1980 | United Kingdom . |
| 1603670 | 11/1981 | United Kingdom . |

*Primary Examiner*—A. Michael Chambers
*Attorney, Agent, or Firm*—Arnold, White & Durkee

[57] ABSTRACT

A coupling having a metal-to-metal seal between a male member and a female seal member, the seal being "preloaded" by means of an internal preload mechanism. The male member engages the seal member, forming the sealing relation between the two. The seal member is allowed to float, or slide, longitudinally within the bore of the female coupling member between a first, extended position and a second, compressed position. The seal member is biased by the preload mechanism into its first, extended position. A force resulting from engagement of the male member and the seal member tends to urge the seal member toward its second, compressed position and that force is opposed by the preload mechanism. The sealing relation between the male member and the seal member is thereby enhanced. An annular metal ring seal may be used to provide a sliding fluid seal between the outer circumference of the seal member and the bore of the female.

24 Claims, 4 Drawing Sheets

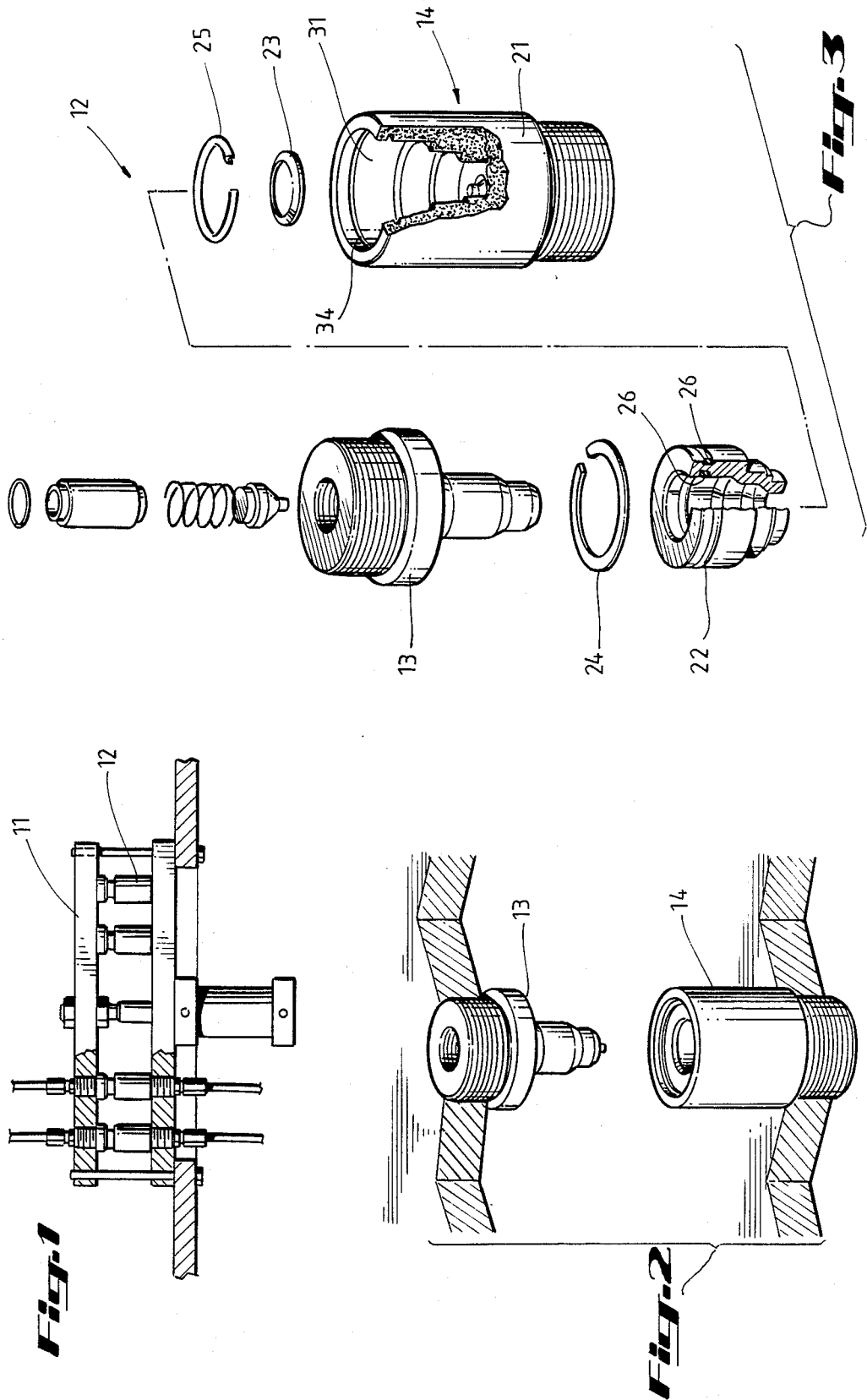

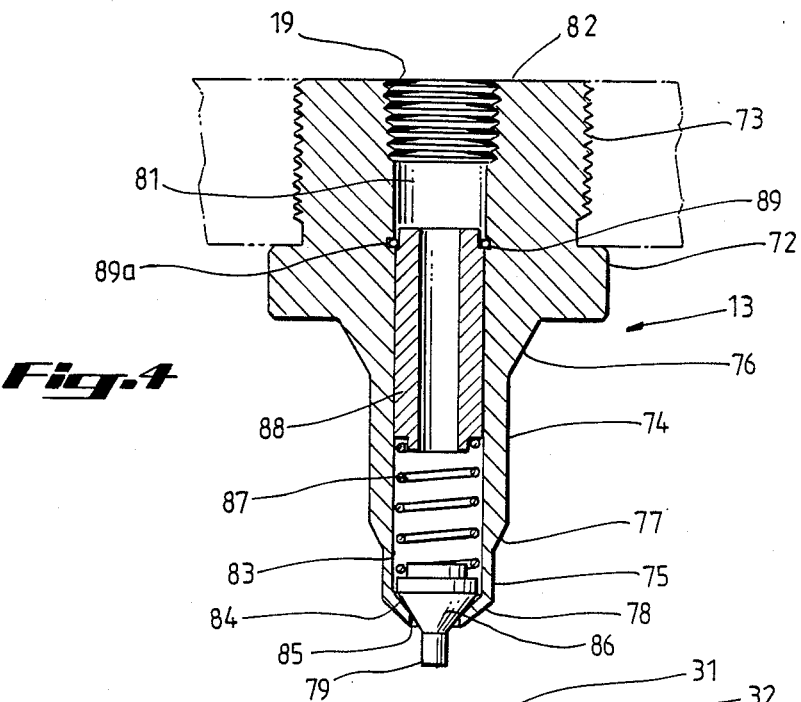
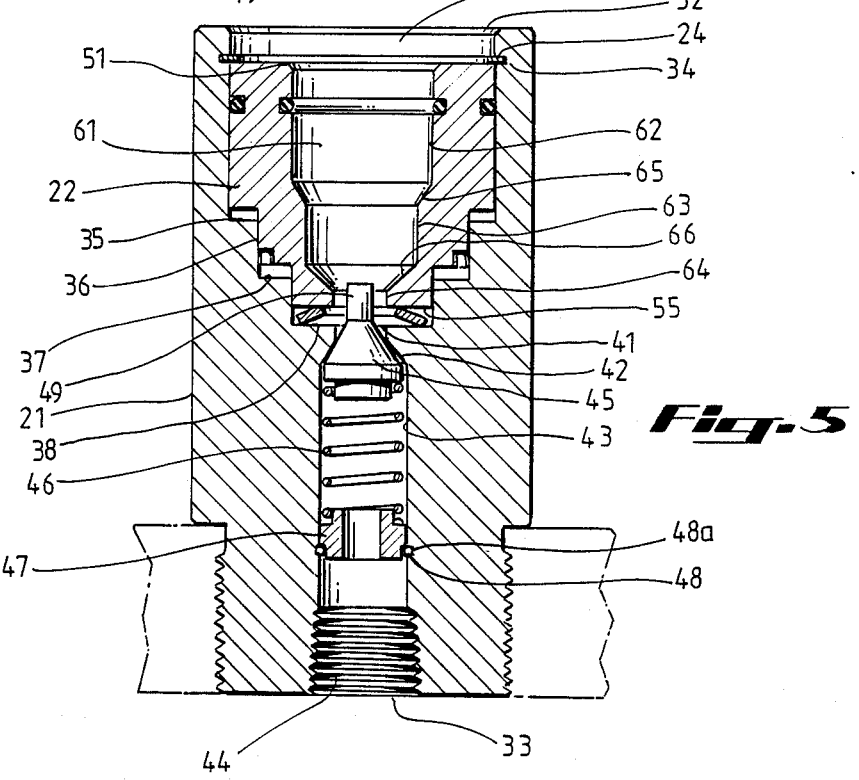

INTERNALLY PRELOADED METAL-TO-METAL SEAL HYDRAULIC CONNECTOR

FIELD OF THE INVENTION

The present invention pertains to couplings and, more specifically, to hydraulic couplings in which a metal-to-metal seal is used between the male and female members.

BACKGROUND OF THE INVENTION

Subsea hydraulic couplings are old in the art. The couplings generally consist of a male and a female member with seals positioned within the female member to seal the junction between the male and female members.

The female member is generally a cylindrical body with a relatively large diameter longitudinal bore at one end and a relatively small diameter longitudinal bore at the other. The small bore facilitates connections to hydraulic lines, while the large bore contains the seals and receives the male portion of the coupling. The male member includes a cylindrical portion at one end having a diameter approximately equal to the diameter of the large bore in the female portion of the coupling. The male member also includes a connection at its other end to facilitate connection to hydraulic lines. When the cylindrical portion of the male member is inserted into the large bore of the female member, according to the various embodiments of the device, the seals, generally resembling 0-rings, either abut the end, or face, of the male member or engage the male member about its circumference. The hydraulic fluid is then free to flow through the female ad male portions of the coupling, and the seals prevent that flow from escaping about the joint in the coupling.

In some instances a check valve may be installed in the female member and also in the male member. Each check valve is opened when the coupling is made up; however, each check valve closes when the coupling is broken, so as to prevent fluid from leaking out of the system of which the coupling is a part.

The seals most commonly used in the past have been of an elastomeric material and such seals have numerous disadvantages. The principal disadvantages are (1) the inability of the seal to withstand the deteriorating effects of a subsea environment for extended periods of time, and (2) the inability of the soft seal to contain the higher pressures being imposed on the hydraulic systems.

Metal seals have been developed to better withstand both the deteriorating effects of the environment and the higher pressures. One such seal is a crush-type which is positioned between the end of the male portion of the coupling and the internal end of the large bore in the female portion. When the male portion is inserted into the female, the metal seal is crushed between the two portions and a seal is effectuated between the two. In view of the crushing action, the seal can be used only once. If the coupling is separated for any reason, the once-used crushed seal must be replaced with a new seal. Also, the male and female members must remain fully engaged to prevent leakage around the seal.

Another type of metal seal has been employed for sealing between the end face of the male member and a shoulder in the bore of the female member. This seal has a cavity which is exposed to pressure in the coupling and, in response to that pressure, the seal tends to expand longitudinally to effectuate the seal between the face of the male member and the shoulder in the female. This longitudinal expansion of the seal tends to force the male member out of the bore of the female member. To overcome the tendency for the male and female members to part, and to insure a sealing relationship of the seal with the male and female members prior to pressurization of the coupling, an external preload mechanism is used which holds the male and female members together. The drawback to this apparatus is that if the internal pressure exceeds the holding capacity of the external preload mechanism, the male and female members will part sufficiently to break the sealing relationship with the metal seal. Also, external preload mechanisms are expensive and require considerable space for mounting in a subsea environment. The complex mechanism affords greater possibility of problems and malfunctions.

The male and female portions of the above couplings are each one-piece devices, and the seal rests at the interior end of the female bore for engagement with the end of the male portion. Particularly in the case of the face-type seals, there is no mechanism for retention of the seal in the female section. If the coupling is parted under pressure, the seal will generally blow out of the female section and be lost. There may also be risk of injury to the operator parting the coupling.

Still another type of metal seal has been used between the male and female members of a coupling. A pressure energized annular seal has been used to seal between the side wall of the male member and the bore wall of the female member. That coupling and metal seal are shown in Applicant's pending application Serial No. 801,477, filed November 25, 1985. The annular metal seal is trapped within the female body by means of a retainer which traps the seal against a shoulder inside the female member. The probe, or male member, is designed to be inserted through the retainer and through the metal seal so that the seal engages the circumference of the probe in a sealing relationship. A cavity in the seal is exposed to the internal coupling pressure to enhance the effectiveness of the seal.

SUMMARY OF THE INVENTION

The present invention provides for a metal-to-metal seal between male and female coupling members with the sealing surface being preloaded from within the coupling itself. One embodiment of the present invention resides in a coupling having a female body, a female seal member, an internal preloading device, and a male probe member. The female body includes a seal bore for slidably receiving the female seal member. The female seal member is allowed to "float" within the seal bore and is biased by the internal preloading device toward a first, extended position in the bore. The female seal member has a longitudinal receiving bore for receiving the male probe member. The receiving bore in the seal member terminates in a female seal seat which is adapted to mate with a male seal seat about the tip of the male probe member. Upon insertion of the male member into the female seal member, the male seal seat mates with the female seal seat to form a metal-to-metal seal, or interface. As the male member is pressed against the female seal member, the female seal member slides longitudinally in the seal bore, against the bias of the internal preloading device. The preloading device thus "preloads? the metal-to-metal seal between the female seal seat in the seal member and the male seal seat on the male probe member.

An annular, pressure-energized metal ring seal may be used in conjunction with the female seal member to provide a sliding fluid seal between the seal member and the seal bore. The metal ring seal may also respond to internal coupling pressure to enhance the fluid seal and to enhance the bias against the female seal member for better "preloading? action.

BRIEF DESCRIPTION OF THE DRAWINGS

FIG. 1 is an elevation view of a manifold incorporating couplings such as that of the present invention.

FIG. 2 is a perspective view of a coupling of the present invention showing how the coupling might be connected to the manifold of FIG. 1.

FIG. 3 is an exploded perspective view of one embodiment of the present invention with the female seal member, the metal ring seal, and the female body partially cut away.

FIG. 4 is a section view of the male member.

FIG. 5 is a section view of the body with the metal ring seal, female seal member and clip in place.

DETAILED DESCRIPTION OF A PREFERRED EMBODIMENT

Figure 6:
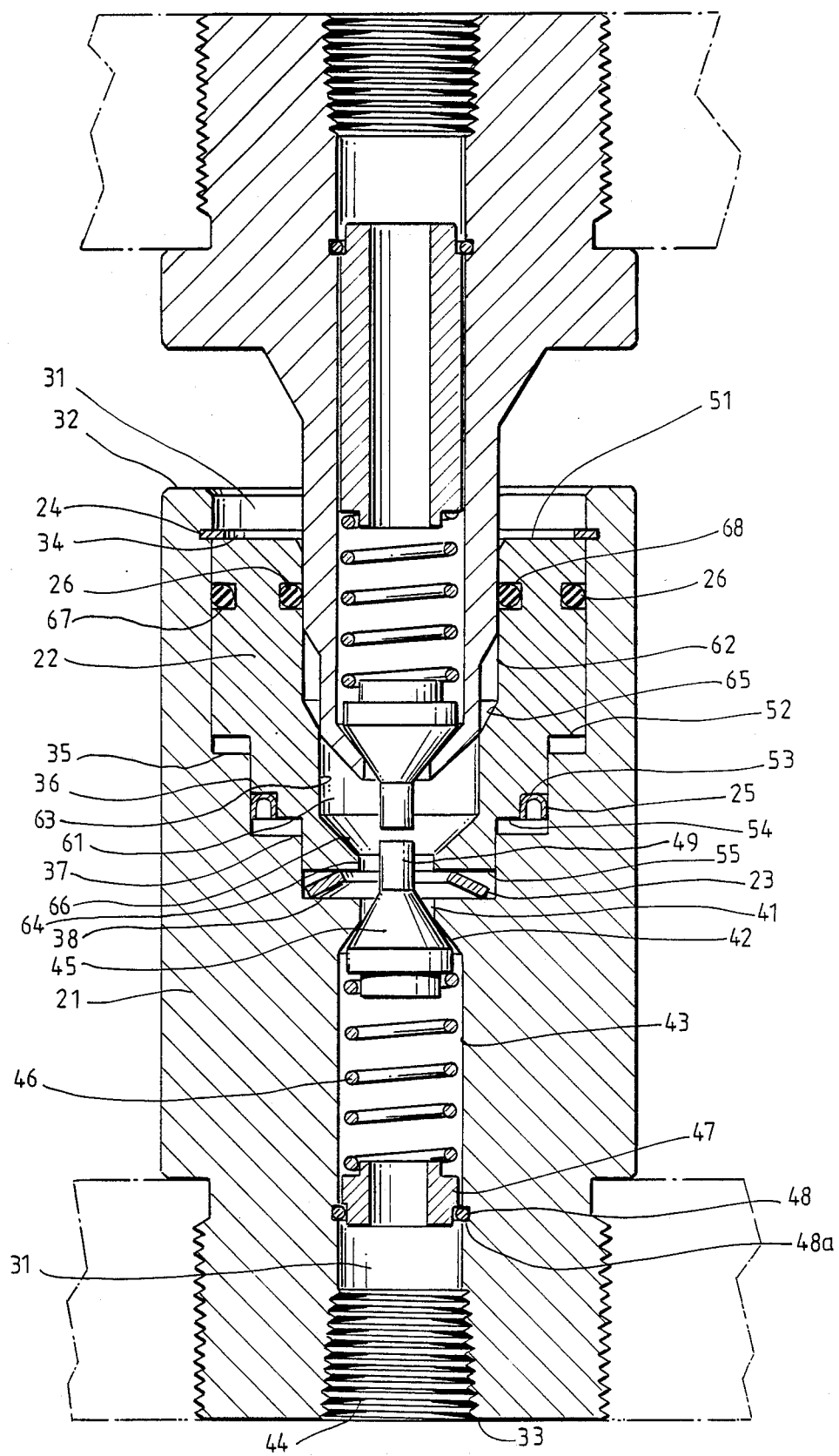
FIG. 6 is an enlarged section view of the partially assembled coupling.

FIG. 1 is an elevation view of a manifold 11 which is commonly used with undersea hydraulic couplings. The couplings 12 are generally connected to opposing plates of the manifold and are held together by bolts or hydraulic members attached to the plates. As shown in FIG. 2, the male member 13 is commonly attached to one plate while the female member 14 is attached to the second plate so as to face the male member 13 and align with it. The male and female members may be attached to the manifold plates using various means, such as set screws or threads. Techniques for attaching the members to such plates are well known to those skilled in the art.

FIG. 3 is an exploded perspective view of a coupling 12 embodying the present invention. As shown, the main components of the coupling 12 include a female member 14 and a male probe 13. The female member 14, or body, and the male member 13, or probe, each include sub-components which will be more fully described below.

As shown in FIG. 3, the female member 14 comprises several components, including a body or receiver 21, a female seal member 22, a clip 24, an internal preloading device 23, and a metal annular ring seal 25. Also included are annular, or axial, soft seals 26.

Referring now to FIG. 5, the main body 21 is cylindrical in shape, having a bore 31 extending along its longitudinal axis from a receiving end 32 to a terminal end 33. The bore 31 has several variations in its diameter as it extends through the body 21.

Referring to FIGS. 5 and 6, the bore 31 has its greatest diameter beginning at the receiving end 32. Adjacent and inboard of the receiving end 32 of the bore 31 is a clip groove 34. The groove 34 is used in conjunction with a clip 24 to retain the female seal member 22 in the bore 31, as will be more fully explained below.

The diameter of the bore 31 is uniform from the receiving end 32 to a first seal shoulder 35. This first seal shoulder 35 is a circumferential shoulder, the plane of which is perpendicular to the longitudinal axis of the body 21. The first shoulder 35 and a seal riser 36 define a stepped reduction in the diameter of the bore 31, as shown in FIG. 3. As can be seen, the seal riser 36 has a circular cross-section which is concentric with and smaller than the circular cross-section of the bore 31 at the receiving end 32.

The reduced diameter of the bore 31 extends from the first seal shoulder 35 to a second seal shoulder 37. The second shoulder 37 once again defines a stepped reduction in diameter of the bore 31. Again, as can be seen by reference to FIG. 3, this reduced diameter is also circular in shape and is centered about the longitudinal axis of the body 21. This reduced diameter extends from the second seal shoulder 37 to the spring seat 38.

The spring seat 38, like the first and second seal shoulders 35 and 37, lies in a plane which is perpendicular to the longitudinal axis of the body 21. The inside diameter of the annular shape of the spring seat 38 defines a valve port 41.

As can best be seen in FIG. 6, the port is of uniform diameter and extends longitudinally from the spring seat 38 to the valve seat 42. The valve seat 42 is conical in shape and effectuates an enlargement of the bore 31 as it extends from the valve port 41 toward the terminal end 33.

The valve seat 42 terminates in a bore wall 43. The bore wall 43 defines a uniform diameter of the bore 31 extending from the valve seat 42 to the terminal end 33. Immediately adjacent the terminal end 33 are threads 44 for engaging a threaded incoming hydraulic line or fitting (not shown).

The body 21 further comprises a check valve 45, a valve spring 46, a spring collar 47, and a collar clip 48.

The valve 45 is generally conical in shape and substantially conforms to the valve seat 42. Located at the apex of the conical shape of the valve 45 is a tip or stem 49 which is cylindrical in shape and extends along the longitudinal axis of the conical shape of the valve 45 and extends through the valve port 41.

The valve spring 46 is located within the bore wall 43 with one end of the spring 46 in contact with the base of the valve 45. The opposite end of the spring 46 is in contact with the spring collar 47. The collar 47 is an elongated ring of circular cross-section, as seen in FIG. 6. The outer diameter of the collar 47 is slightly less than the diameter of the bore 31 as defined by the bore wall 43, so that the collar 47 may be easily inserted therein. The collar 47 engages the end of the helical valve spring 46.

The collar 47 is retained within the bore 31 and is urged into contact with the spring 46 by means of a collar clip 48 and clip groove 48a. The groove 48a is located in the bore wall 43 and extends continuously about the wall 43. The clip 48 is a spring clip or snap ring which may be compressed inwardly so as to reduce its diameter for insertion into the bore 31 and thereafter expand outwardly to engage the outer diameter of the groove 48a. The inner diameter of the clip 48 is less than the outer diameter of the collar 47, thus preventing the escape of the collar 47 from the bore 31.

As shown in FIG. 3, the female seal member 22 is essentially a sleeve with an annular shape. The outer circumference of the seal member 22 is stepped, having four different diameters, so as to complement the stepped bore 31 of the female body 21. As seen in FIGS. 5 and 6, the outer diameter of the seal member 22 is greatest at its receiving end 51. The diameter is constant from the receiving end 51 of the seal member 22 to a first seal member shoulder 52. This first shoulder 52 is a circumferential shoulder, the plane of which is perpendicular to the longitudinal axis of the seal member 22. The diameter of the seal member 22 again remains constant from the first seal member shoulder 52 to a second seal member shoulder 53. This second shoulder 53 is also perpendicular to the longitudinal axis of the seal member 22 and it effectuates a further reduction in the outer diameter of the seal member 22. That outer diameter once again remains constant between the second seal member shoulder 53 and a third seal member shoulder 54. The circumference of the seal member 22 in the area between the second shoulder 53 and the third shoulder 54 provides a groove for receiving the ring seal 25, as will be discussed below. The third seal member shoulder 54, also perpendicular to the longitudinal axis of the seal member 22, defines the final reduction in the outer diameter of the seal member 22. The outer diameter then remains constant between the third shoulder 54 and the end face 55 of the seal member 22.

The female seal member 22 has a receiving bore 61 along its longitudinal axis. As can most easily be seen by reference to FIG. 6, the diameter of the bore 61 varies along its longitudinal axis and is generally defined by first, second and third bore walls 62, 63 and 64, respectively, a probe seat 65, and a female seal seat 66. The receiving bore 61 has its greatest diameter at the receiving end 51 of the seal member 22. The first wall 62 defines a constant diameter between the receiving end 51 and the probe seat 65. The probe seat 65 inclines inwardly to gradually reduce the diameter of the bore 61 as the bore 61 continues away from the receiving end 51. The probe seat 65 terminates in the second bore wall 63, which again defines a constant diameter of the bore 61. This constant diameter extends between the probe seat 65 and the female seal seat 66. The seat 66, like the probe seat 65, slopes inwardly, further restricting the diameter of the bore 61. The female seal seat 66 terminates in a third bore wall 64. The third wall 64 terminates at the seal member end face 55, which lies in a plane perpendicular to the longitudinal axis of the seal member 22.

A circumferential outer seal groove 67 is located about the outer diameter of the seal member 22 adjacent the receiving end 51 of the member 22. Another circumferential seal groove 68 is located in the receiving bore 61 adjacent the receiving end 51 of the seal member 22. The circumferential seal grooves receive annular, or axial, soft seals 26 for sealing between the outer circumference of the seal member 22 and the female bore 31 and for sealing between the receiving bore 61 and the outer circumference of the male probe 13, respectively. The annular seals 26 are of a relatively pliable material, for example, rubber or synthetic elastomer. The annular seals 26 are each of greater thickness than the respective depths of the grooves 67 and 68. As a result, the seals 26, when properly positioned in their respective grooves, protrude slightly therefrom.

Located in the female bore 31 adjacent the receiving end 32 of the female body 21 is a clip groove 34 which is used in conjunction with the clip 24 to retain the female seal member 22 within the bore 31 of the female. The clip 24 is a spring clip, or snap ring, whose outside diameter is greater than the diameter of the clip groove 34. As shown in FIG. 6, the inside diameter of the clip 24 is less than the diameter of the bore 31 and is also less than the outside diameter of the seal member 22. When the clip 24 is positioned in the groove 34, it exerts an outward expanding force against the groove 34 so as to be held in the groove 34.

Continuing to refer to FIG. 6, an annular ring seal 25, generally ring-shaped when viewed from its end and generally C-shaped in cross-section, is positioned about the circumference of the seal member 22 between the second and third shoulders 53 and 54, respectively, of the seal member 22. The outside diameter of the seal 25 is substantially the same as the diameter of the female bore 31 as defined by the seal riser 36. The inside diameter of the seal 25 is substantially the same as the outside diameter of the seal member 22 between the second and third shoulders 53 and 54, respectively. It is preferable that the ring seal 25 undergo slight radial compression when trapped between the seal member 22 and the female bore wall 31. The seal 25 is preferably a metallic, elastic member capable of regaining its original shape following radial or longitudinal compression. However, in applications which do not involve corrosive or harsh environments, the ring seal 25 may be of an elastomer, or similar, material.

Figure 7:
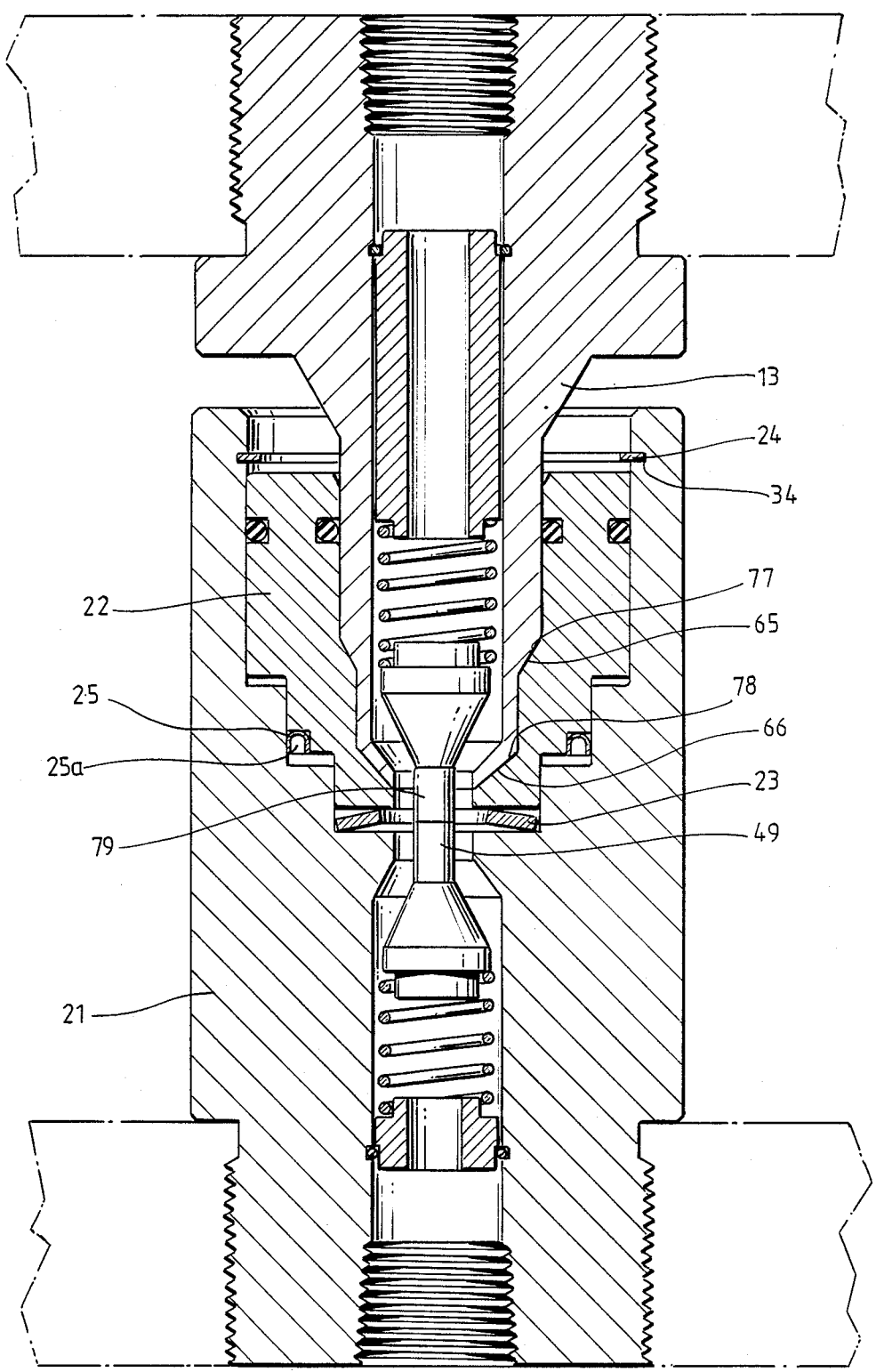
FIG. 7 is an enlarged section view of the fully assembled, internally-preloaded coupling.

A Bellville spring washer 23, or similar device, is trapped between the seal member end face 55 and the spring seat 38 in the female body 21. The spring washer 23 urges the seal member 22 toward the receiving end 32 of the female bore 31 into contact with the clip 24. The seal member 22 is prevented from escaping from the bore 31 because of the clip 24. However, because the overall length of the seal member 22 is less than the length of the female bore 31 between the clip 24 and the spring seat 38, and because of the differences in the respective shoulders on the seal member outer wall and the female bore wall, the seal member 22 can "float" between a first, extended position wherein it is in contact with the clip 24 and a second, compressed position wherein the spring washer 23 is fully compressed. This fully compressed position is illustrated in FIG. 7. At each of these extreme positions and at any position therebetween, the metal ring seal 25 retains its position with respect to the seal member 22 outer wall. Thus, as the seal member 22 slides within the female bore 31, the point at which the ring seal 25 engages the female bore wall also moves longitudinally.

The male member 13, or probe, as shown in FIG. 4, comprises generally three cylindrical shapes. A probe handle 72 is a cylinder of substantially uniform outside diameter. Threads 73 may be added to the external surface to facilitate attachment to a coupling manifold, as explained above, or the external surface may be machined smooth and the probe 13 may be attached to the manifold by means of set screws. A probe wall 74 and a probe head 75 also have uniform outside diameters.

The probe handle 72 and probe wall 74 lie along the same longitudinal axis and are connected by a first shoulder 76. The first shoulder 76 is a truncated, conical section whose larger diameter face is coincident with an end of the handle 72, and whose smaller diameter face is coincident with an end of the wall 74.

The probe head 75 is a cylindrical member lying along an extension of the longitudinal axis of the probe wall 74. The head 75 is connected to the wall 74 by means of a second shoulder 77. The second shoulder 77 is a truncated cone section whose larger diameter face is coincident with an end of the wall 74, and whose smaller diameter face is coincident with an end of the head 75. The probe head 75 terminates in a male seal seat 78 which is also a truncated conical section. The second shoulder 77 is adapted for engagement with the probe seat 65 in the receiving bore 61 of the seal member 22 when the probe 13 is seated in the seal member 22.

The surface of the male seal seat 78 is a ground surface for mating with the ground surface of the female seal seat 66 in the seal member 22. When the probe 13 is fully inserted into the receiving bore 61 of the seal member 22, the male and female seal seats 78 and 66, respectively, abut to form a metal-to-metal seal. This can easily be seen by reference to FIG. 7. Continued longitudinal movement of the probe 13 with respect to the female body 21 results in sliding movement of the female seal member 22 in the female bore 31. This sliding movement is resisted by the spring washer 23 and, thus, the metal-to-metal seal at the male and female seal seats 78 and 66, respectively, is "preloaded".

As shown in FIG. 4, a passageway 81 of circular cross-section is centered on the longitudinal axis of the probe 13 and extends from a terminal end 82 to the male seal seat 78. Near the male seat 78, the bore wall 83 slopes inwardly to form a valve seat 84. Adjacent the male seal seat 78, the bore wall 83 again parallels the longitudinal axis of the probe 13, defining a valve port 85 therein. The valve port 85 is of substantially the same diameter as the valve port 41 in the female body 21.

As in the female body 21, the probe 13 contains a check valve 86, a valve spring 87, a spring collar 88, and a collar clip 89. The structure of this valve assembly is substantially the same as the structure of the corresponding valve assembly in the body 21 described above. A clip groove 89a is located in the bore wall 83 near the terminal end 82 of the probe 13. As in the case of the valve assembly in the body 21, a clip groove 89a retains a collar clip 89 which, in turn, retains a spring collar 88 within the bore 81. Also located in the bore 81 adjacent the terminal end 82 of the probe 13 are threads 91 for receiving a threaded incoming tubular member or fitting (not shown).

Operation of a Coupling According to the Present Invention

Assembly and operation of a coupling according to the present invention may be best understood by reference to FIGS. 6 and 7 and is substantially as follows:

The female member is first assembled using the body 21, the spring washer 23, the ring seal 25, the female seal member 22 with soft seals 26, and the clip 24. The spring washer 23 is positioned in the female bore 31 and rests on the spring seat 38 in the bore 31. The ring seal 25 is positioned about the outer circumference of the seal member 22 between the second and third shoulders 53 and 54, respectively. The seal member 22 and ring seal 25 are then together inserted into the bore 31 of the female to engage the spring washer 23. The seal member 22 is forced against the spring washer 23 sufficiently to allow the clip 24 to be inserted into the clip groove 34. The length of the spring washer 23 is such as to normally maintain the seal member 22 in contact with the clip 24. The female member then composes a unit in which the spring washer 23, the ring seal 25, and the floating seal member 22 are entrapped.

The probe 13 is inserted into the receiving bore 61 of the seal member 22 with its male seal seat 78 entering the bore 61 first. The probe 13 is inserted until the male seal seat 78 abuts the female seal seat 66 in the receiving bore 61 of the seal member 22. As explained above, the male and female seal seats 78 and 66, respectively, are mating ground surfaces for effectuating a metal-to-metal seal between the probe 13 and the seal member 22.

As longitudinal movement of the probe 13 with respect to the female body is continued, the male seal seat 78 presses against the female seal seat 66 in the receiving bore 61, forcing the seal member 22 to slide in the female bore 31 against the bias of the spring washer 23, thus "preloading" the metal-to-metal seal. The end of the probe valve tip 79 contacts the end of the valve tip 49 located in the female body and continued insertion of the probe 13 into the bore 31 causes the valves 86 and 45 to mutually exert opening forces.

The insertion of the probe 13 into the female may be limited by the relative positions of the seal member shoulders 52 and 54 and female bore shoulders 35 and 37 or by the complete compression of the spring washer 23, whichever is preferred.

When the valves 86 and 45 open, the bores 81 and 31 are exposed to the pressure present in the connected lines and that pressure is transmitted to the cavity 25a of the ring seal 25. In response to that pressure, the seal 25 is urged radially inwardly and outwardly to enhance the sealing effect at the seal member 22 outer circumference and the wall of the female bore 31. Also, a longitudinal force is imparted to the ring seal 25 by the pressure in the cavity 25a which tends to force the female seal member 22 against the male seal seat 78. As the line pressure increases within the system, the sealing pressure between the female seal seat 66 and the male seal seat 78 is increased. The female seal member 22 is allowed to float within the bore 31 of the female body 21 to compensate for tolerances in the connector and for tolerances in the mounting and retaining devices.

It will now be understood by those of skill in the art that an improved connector may be made utilizing the present invention. Although variations in the embodiment of the present invention may not each realize all the advantages of the invention, certain features may become more important than others in various applications of the device. The invention, accordingly, should be understood to be limited only by the scope of the appended claims.

What is claimed is:

1. A coupling comprising:
  a female member having a longitudinal bore therethrough;
  a female seal member having an outer circumference for sliding engagement with the bore of the female;
  a metal ring seal for engagement with the outer circumference of the female seal member and with the longitudinal bore of the female member to effectuate a first fluid seal therebetween;
  a male member for insertion into the female seal member to form a second fluid seal therebetween; the male member being slidable with respect to the female member while maintaining the second fluid seal with the female seal member; and
  an internal preload device to urge the female seal member into contact with the male member, the female seal member adapted to slide longitudinally with respect to the female member during relative axial displacement of the male member and the female member.

2. The coupling of claim 1, further comprising:
  a circumferential shoulder in the of the female; and
  a clip adapted for engagement with the bore of the female, the shoulder and clip cooperating to retain the female seal member in the bore of the female and to limit longitudinal movement by the seal member in the bore.

3. The coupling of claim 2, wherein the preload device comprises a spring positioned between the seal member and the shoulder for urging the seal member longitudinally away from the shoulder and toward the clip.

4. The coupling of claim 1, wherein the male member includes a male seal seat for engagement with a female seal seat in the seal member to form the fluid seal therebetween.

5. The coupling of claim 1, wherein the female seal member has a groove about its circumference for holding the ring seal when the seal member slides longitudinally within the bore of the female.

6. The coupling of claim 1, wherein the ring seal includes a cavity exposed to fluid pressure in the coupling, the seal responsive to pressure in the cavity to expand radially to effectuate a fluid seal between the circumference of the female seal member and the bore of the female member.

7. The coupling of claim 1, wherein the ring seal includes a cavity exposed to fluid pressure in the coupling, the seal responsive to pressure in the cavity to urge the female seal member into contact with the male member to form a fluid seal therebetween.

8. The coupling of claim 1, wherein the female seal member is responsive to fluid pressure in the coupling to be urged into contact with the male member to form a fluid seal therebetween.

9. An undersea hydraulic coupling, comprising:
a female member having a longitudinal bore therethrough, the bore having a circumferential shoulder therein;
a sleeve-like female seal member for sliding insertion into the bore, the seal member having a groove about its outer circumference;
a generally ring-shaped pressure-energized metal seal for engagement with the groove in the seal member and with the wall of the bore in the female member;
a male member having a leading face for sealing insertion into the seal member;
bias means for biasing the seal member out of contact with the shoulder and into contact with the male member; and
retention means for holding the female seal member in the bore of the female member,
the seal member and male member being adapted to slide longitudinally within the bore of the female member during relative displacement of the male member and female member while maintaining mutual sealing contact at the male member leading face and sealing contact with the longitudinal bore.

10. The coupling of claim 9, wherein the metal seal is responsive to pressure in the coupling to be urged to expand radially to effectuate a sliding fluid seal between the retainer and the bore of the female member.

11. The coupling of claim 9, wherein the female seal member is responsive to pressure in the coupling to engage the male member in a sealing relationship.

12. A coupling, comprising:
a female member having a longitudinal bore therethrough;
a female seal member for insertion into the bore; a metal ring seal providing a sliding seal between the circumference of the female seal member and the longitudinal bore; the female seal member being slidable within the bore between a first, extended position and a second, compressed position while maintaining the seal with the bore; the female seal member having a seal seat;
a preload mechanism for biasing the seal member toward its first, extended position in the bore; and
a male member having a leading face for sealing engagement with the seal seat, the male member urging the seal member toward its second, compressed position in the bore; the male member being slidable within the bore between the first position and the second position while maintaining sealing engagement between the leading face and the seal seat.

13. A coupling comprising:
a female member having a longitudinal bore extending therethrough and a first internal shoulder intermediate the bore;
a sleeve member insertable into and sealingly engageable with the longitudinal bore, the sleeve member having a central bore and a seal seat at one end of the central bore;
a male member insertable into the central bore of the sleeve and having a leading face sealingly engageable with the seal seat;
the sleeve member being responsive to fluid pressure within the coupling to urge the sleeve member to slide axially and maintain sealing engagement with the male member leading face during axial displacement of the male member relative to the female member; and
bias means adapted to urge the sleeve member to slide axially against the male member leading face and away from the first internal shoulder;
wherein the longitudinal bore of the female member comprises second and third internal shoulders, the sleeve member having mating first and second external shoulders, the sleeve member sealing with the female member bore at any axial position between the second and third internal shoulders.

14. The coupling of claim 13 further comprising interlocking means adapted for engagement with the female member bore, the interlocking means retaining the sleeve member in the bore and limiting longitudinal movement by the sleeve member.

15. The coupling of claim 13 wherein the bias means comprises a spring positioned between the sleeve member and the first internal shoulder for urging the sleeve member away from the first internal shoulder.

16. The coupling of claim 13 further comprising a pressure-energized annular seal interposed between the sleeve member and the female member bore, the seal having a cavity exposed to fluid pressure within the coupling.

17. A coupling comprising:
a first coupling member having a central bore and first and second internal shoulders intermediate the bore;
a seal member insertable into the central bore and having a circumferential seal for sealing engagement with the central bore of the first coupling member at any axial location between the first and second internal shoulders;
a second coupling member insertable into the central bore and sealing with the seal member; and
the circumferential seal responsive to fluid pressure to urge the seal member to slide axially to maintain sealing engagement between the seal member and the second coupling member at any axial location between the first internal shoulder and second internal shoulder;

wherein the seal member comprises a cylindrical body having a first end and a second end, first and second external shoulders, a central bore, and a seal seat at the end of the bore adjacent the first end of the body; and wherein the male member comprises a probe insertable into the central bore of the seal member and having a leading face sealingly engageable with the seal seat.

18. The coupling of claim 17 wherein the circumferential seal comprises an annular metal seal positioned adjacent the first external shoulder, the metal seal having a cavity exposed to fluid pressure in the coupling.

19. The coupling of claim 17 further comprising bias means interposed between the first internal shoulder of the central bore of the first coupling member and the seal member.

20. A coupling comprising:
a female member having a bore extending therethrough and first, second and third internal shoulders progressively spaced within the bore;
a sleeve for sliding insertion in the female member bore, the sleeve having an end face, first and second external shoulders progressively spaced along the sleeve, a circumferential groove adjacent the first external shoulder, and a central bore terminating at a seal seat adjacent the end face;
an annular seal adapted to be inserted in the groove, the annular seal being sealingly engageable with the female member bore at any axial location between the second and third internal shoulders, the annular seal responsive to fluid pressure to impart an axial force against the groove away from the second internal shoulder and toward the third internal shoulder; and
a male member adapted for insertion into the sleeve bore and having a leading face adapted for sealing engagement with the seal seat; the male member leading face maintaining sealing engagement with the seal seat during axial displacement of the annular seal between the second and third internal shoulders.

21. The coupling of claim 20 further comprising an internal preload device adapted to urge the sleeve away from the first internal shoulder and into sealing engagement with the leading face of the male member during axial movement of the male member relative to the female member.

22. The coupling of claim 20 wherein the annular seal comprises a metal seal having a cavity exposed to fluid pressure within the coupling, the fluid pressure urging the metal seal to expand radially against the female member bore and the sleeve.

23. A coupling comprising:
a female member having a longitudinal bore extending therethrough and a first internal shoulder intermediate the bore;
a sleeve member insertable into and sealingly engageable with the longitudinal bore, the sleeve member having a central bore and a seal seat at one end of the central bore;
a male member insertable into the central bore of the sleeve and having a leading face sealing engageable with the seal seat;
the sleeve member being responsive to fluid pressure within the coupling to urge the sleeve member to slide axially and maintain sealing engagement with the male member leading face during axial displacement of the male member relative to the female member;
bias means adapted to urge the sleeve member to slide axially against the male member leading face and away from the first internal shoulder; and
interlocking means adapted for engagement with the female member bore, the interlocking means retaining the sleeve member in the bore and limiting longitudinal movement by the sleeve member.

24. A coupling comprising:
a female member having a longitudinal bore extending therethrough and a first internal shoulder intermediate the bore;
a sleeve member insertable into and sealingly engageable with the longitudinal bore, the sleeve member having a central bore and a seal seat at one end of the central bore;
a male member insertable into the central bore of the sleeve and having a leading face sealingly engageable with the seal seat;
the sleeve member being responsive to fluid pressure within the coupling to urge the sleeve member to slide axially and maintain sealing engagement with the male member leading face during axial displacement of the male member relative to the female member; and
bias means adapted to urge the sleeve member to slide axially against the male member leading face and away from the first internal shoulder;
wherein the bias means comprises a spring positioned between the sleeve member and the first internal shoulder for urging the sleeve member away from the first internal shoulder.

* * * * *

UNITED STATES PATENT AND TRADEMARK OFFICE
CERTIFICATE OF CORRECTION

PATENT NO. : 4,884,584
DATED : December 5, 1989
INVENTOR(S) : Robert E. Smith III It is certified that error appears in the above-identified patent and that said Letters Patent is hereby corrected as shown below:

Title page, heading, after Smith insert --III--.

Title page, at [75], after Smith insert --III--.

Title page, U.S. PATENT DOCUMENTS, second column, second entry, after Smith insert --III--.

Column 1, line 33, delete "ad" and insert --and--.

Column 2, line 68, delete " "preloads? " and insert --"preloads"--.

Column 3, line 9, delete " "preloading? " and insert --"preloading"--.

Column 8, line 66, delete "the of" and insert --the bore of--.

Column 12, line 13, delete "sealing" and insert --sealingly--.

Signed and Sealed this

Sixteenth Day of July, 1991

*Attest:*

HARRY F. MANBECK, JR.

*Attesting Officer*    *Commissioner of Patents and Trademarks*